Jan. 24, 1928.

H. L. DARDELET 1,657,244

TIGHT HOLDING BOLT AND NUT

Filed May 19, 1925    2 Sheets-Sheet 1

Inventor
Hugues Louis Dardelet,
Maurice, Cameron, Lewis & Kirkam
By
Attorneys

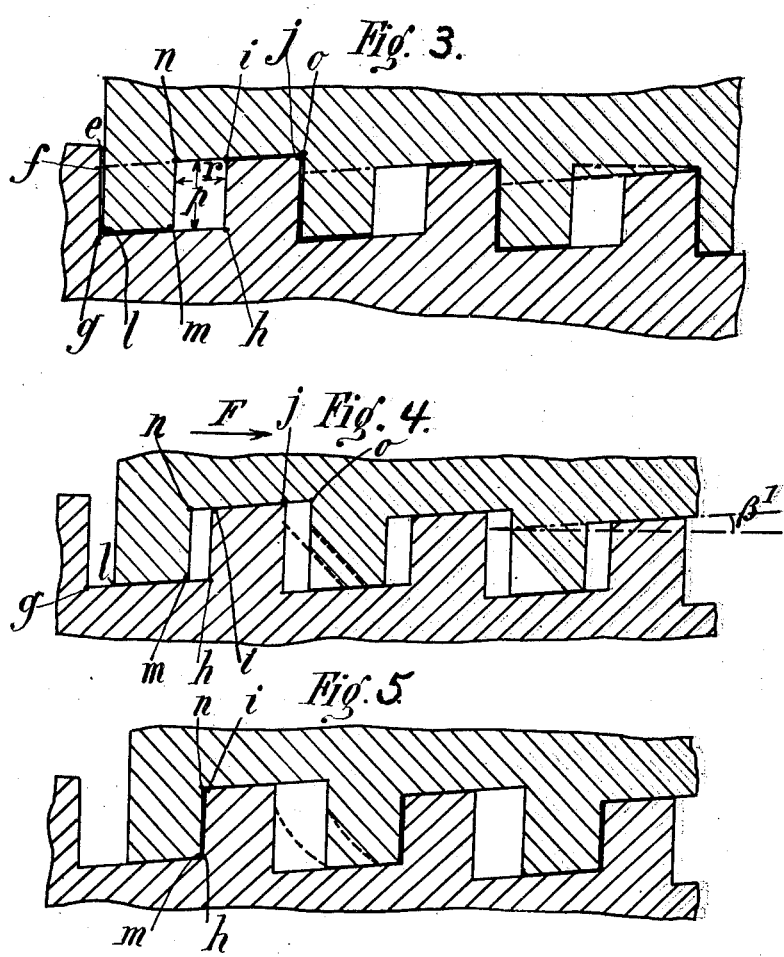

Patented Jan. 24, 1928.

1,657,244

UNITED STATES PATENT OFFICE.

HUGUES LOUIS DARDELET, OF NANTES, FRANCE, ASSIGNOR TO SOCIETE FRANCAISE DE FILETAGE INDESSERRABLE D. D. G., OF PARIS, FRANCE.

TIGHT-HOLDING BOLT AND NUT.

Application filed May 19, 1925, Serial No. 31,392, and in France September 5, 1924.

My invention has for certain of its objects to provide an improved screw coupling for two members such, for example, as a bolt and nut, which will withstand great strain in the direction of uncoupling; to provide a simple and efficient screw coupling wherein the coacting threads are so formed as to permit ready connection and disconnection of the parts by relative turning movement, effected by a wrench or other suitable tool, but to prevent accidental unscrewing; and to provide a tight-holding threaded connection for two members such as a bolt and nut, so formed that liability of rupture during or after connection of the parts is reduced to a minimum, and that the members may be repeatedly connected and disconnected without materially affecting the efficiency of the threaded connection.

My invention also comprises providing a fastening means comprising a nut and a bolt threaded for connection with each other, wherein the nut and bolt threads are of equal and constant pitch and each has a uniform cross-sectional contour at all points in the length thereof, and wherein the cross-sectional thread contours are such as to permit easy unscrewing of the nut and to provide opposed initially acting thread surfaces for advancing the nut to the work and for effecting tight holding of one thread to the other upon screwing of the nut against the work and opposed finally acting thread faces for effecting tight screwing of the nut against the work.

My invention also includes the provision of a screw thread connection between two parts wherein the interfitting threads are of equal and constant pitch and of such cross-sectional contour as to allow axial play within fixed limits and effect tight holding between said parts upon taking up of the axial thread play in one direction and free relative turning movement between the parts upon taking up of the axial thread play in the opposite direction, and wherein the thread contours are such as to offer great resistance to axial stresses.

My invention also includes providing a tight-holding thread connection for two members wherein a male thread on one members and a female thread on the other member have opposed face portions of different widths adapted to be jammed one across the other while in engagement by axial movement between the parts and at least one of which makes an angle with the axial line of the thread on which it is formed, and wherein the male and female threads have opposed face portions for positively limiting the extent of crosswise movement between the first-mentioned face portions of the two threads.

Furthermore, the invention comprises providing a tight-holding screw thread connection for two parts, such as a bolt and nut, wherein the coacting threads are formed to permit a substantial or appreciable relative displacement between the threads crosswise of the threads, i. e. axially of the screw thread connection, in the direction of disconnection to effect jamming between coacting helicoidal reaction face portions of the threads, and are also so formed as to positively limit the extent of such relative displacement. The invention further comprises providing a tight-holding screw thread connection wherein the coacting threads have coacting helicoidal reaction face portions, making an angle with the axial line of the threads less than the angle of friction, and coacting helicoidal reaction face portions making an angle with the axial line of the threads greater than the angle of friction, the pitch of the threads and the relative widths of the coacting face portions making the lesser angle being correlated to permit firm jamming of said latter face portions on each other before the faces making the greater angle come into engagement.

Preferably, also, the invention comprises a tight-holding screw thread connection wherein complementary threads of equal pitch and depth are so formed as to jam upon each other upon relative axial displacement of the connected threads in one direction and so constructed as to positively limit the degree of strain brought upon the parts by the jamming and offer great resistance to direct axial stresses after jamming of the threads on each other. The invention also comprises providing a screw-thread on a threaded member which thread has a reaction face formed with a jamming portion and a jamming movement limiting portion, and preferably has a reaction face formed with two helicoidal face portions making an angle to the axial line of the thread less than the angle of friction, and an intermediate helicoidal face portion making an angle to the axial line of the thread greater than the angle of friction, the two face portions making the lesser angle differing in width.

The inventive idea may receive a variety of mechanical expressions, one of which, for the purpose of illustrating the invention, is shown in Figs. 2, 3, 4, and 5 of the accompanying drawings, but it is to be expressly understood that said drawings are for the purpose of illustration only and are not designed to define the limits of the invention, reference being had to the appended claims for this purpose.

In said drawings:—

Fig. 3 is an enlarged sectional detail view of the nut and bolt illustrated in Fig. 2, showing the jamming faces and the jamming-action-limiting faces disengaged;

Fig. 4 is a view similar to Fig. 3, showing the jamming faces of the nut and bolt threads in engagement; and Fig. 5 is a view similar to Fig. 4 showing the jamming faces and the jamming-action-limiting abutment faces in engagement.

As a general rule, the threads of bolts and nuts and other connected screw-threaded parts are of regular triangular, rectangular, or other symmetrical form in cross-section the two side faces of the threads making equal angles with the axial line of the thread.

Figure 1:
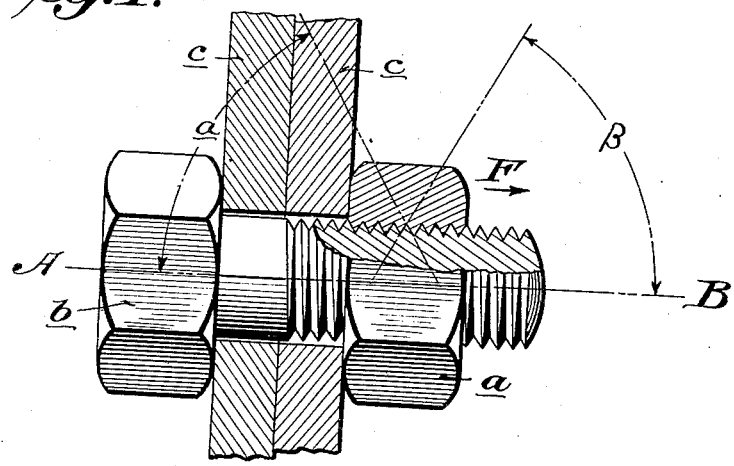
Fig. 1 is a diagrammatic partially sectional view of a known type of bolt and nut.

In the case of the known type of nut shown in Fig. 1, the angles $\alpha$ and $\beta$ which form the two sides of the outline of the thread relatively to the center line A—B are equal.

Figure 2:
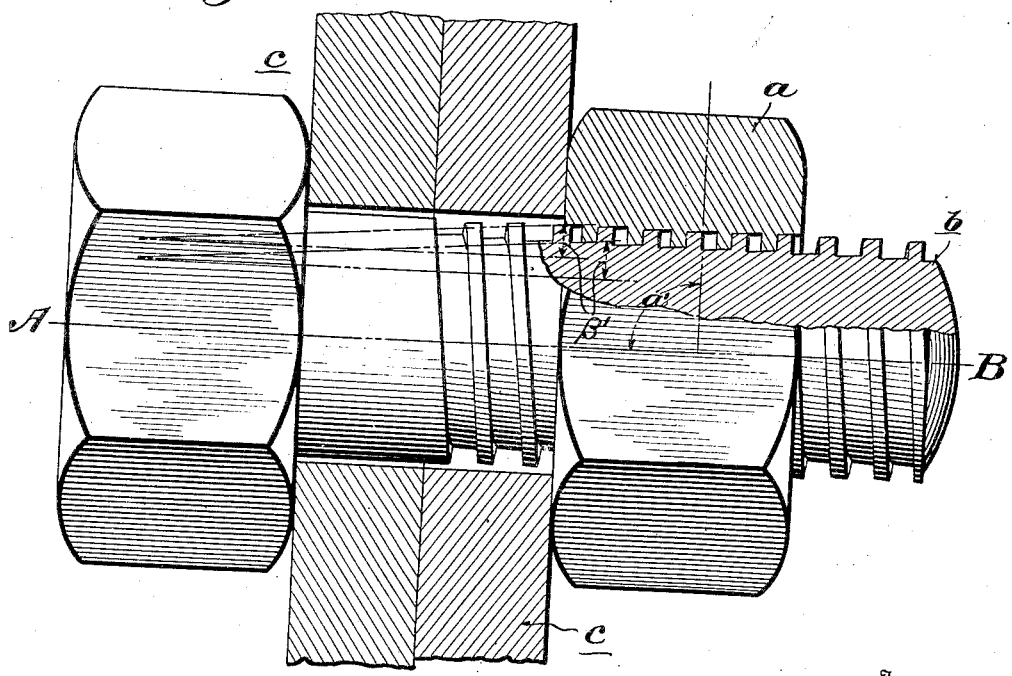
Fig. 2 is a view, partly in section and partly in side elevation, of a nut and bolt made in accordance with the present invention.

The present invention provides an improved tight-holding bolt and nut arrangement which is characterized by the fact that the surface of each thread subject to pressure during the screwing of the nut has a smaller inclination than the opposed face of the thread, i. e. as shown in Figs. 2 and 4, in which $a$ is the nut, $b$ the bolt and the direction of the reaction upon the nut when it is screwed, is to the right, the device is characterized by the fact that the angle $\beta^1$ is much smaller than the angle $\alpha^1$, which latter may be 90°.

Calculation shows that this arrangement will comply with the necessary conditions for the tight-holding, which may be practically set forth as follows.

A nut is said to be tight-holding when the minimum moment (relative to the axis) of the friction effort holding the nut to the bolt is greater than the maximum moment (relative to the axis) of the friction effort holding the nut to the bolted pieces. Herein the nut is more firmly held upon the bolt than upon the said pieces $c$, and during any jarring or movement of the pieces, the said nut will be displaced relatively to the said pieces and not relatively to the bolt, so that the bolt and nut will not come apart.

It is an easy matter to make calculations— with reference to the pitch, the diameter of the bolt head or of the nut and of the friction coefficient of the metals in contact—of the value to be assigned to the angle $\beta^1$ whereby the nut will hold fast under all accidental circumstances. The nut may however be removed by the use of a wrench, in the known manner.

When the pieces to be held together by the bolt and nut are not required to be clamped together with any great effort by screwing the nut, there may be assigned to the angle $\beta^1$ a value which is smaller than what is otherwise required for tight holding, and such that upon screwing the nut into place it will afterwards remain jammed upon the bolt even should the pieces be subject to a certain wear; herein the nut is held to the bolt in a manner which may be compared with that of a hoop which has been put on in the hot state.

Calculation will show the proper proportions between the diameter of the bolt, the pitch, the depth of the threads, and the friction coefficient of the metals in contact, whereby the said jamming or gripping action may be obtained. Practically the nut will be held fast on the bolt when the tangent of the angle $\beta^1$ becomes smaller than the friction coefficient of the metals in contact. When the nut is thus jammed upon the bolt, the pieces of work $c$ may be subject to a certain wear without any loosening of the nut. But in spite of these conditions the nut may be removed with a wrench by the use of an effort which need not be greater than what was employed for screwing the nut. It will be apparent, however, that, where the pieces to be held together by the bolt and nut are to be clamped together with any great effort, the nut will be liable to be either stripped from the bolt or burst in constructions in which the aforesaid smaller value is assigned to the angle $\beta^1$. To obviate this drawback, while at the same time obtaining the advantage of the jamming of the nut on the bolt, I provide a thread as shown in Figs. 3, 4 and 5.

Referring to Figs. 3, 4 and 5, the part $f$, $i$ of the thread as shown in dot and dash lines is brought towards the centre line of the bolt by the distance $p$; the same is true for the threads of the nut, so that instead of the outline $e f i j$ the thread will have the outline $e g h i j$ . . . The part of the thread $g h$ that has been displaced in depth is greater in width than the remainder $i\ j$. I effect a like displacement for the thread of the nut, and each operative face thereof comprises two displaced parts $l\ m$ and $n\ o$ of unequal width.

In these conditions, there will exist a space $r$ between the faces $m\ n$ of the nut and the faces $h\ i$ of the bolt, so that when the nut is put on the bolt, the threads of these two members will have the relative position shown in Fig. 3.

Upon tightening the nut, since the reaction is exercised according to the arrow F, the inclined faces $l\ m\ g\ h$ on the one hand and $n\ o\ i\ j$ on the other will be mutually slidable transversely or crosswise of each other and will assume the position Fig. 4 wherein the nut will be jammed on the bolt if the angle $\beta^1$ is small enough to comply with the aforesaid condition for the jamming.

Should the effort urging the nut in the direction of the centre line become considerable, the threads will be additionally displaced crosswise of each other and assume the position shown in Fig. 5 wherein the faces $m\ n$ and $h\ i$ which are substantially perpendicular to the centre line will now be in contact, thereby limiting the relative crosswise sliding motion of the thread of the nut without positively stopping the screwing up of the nut. It will be noted that the displacement of the reaction faces of the threads in depth will determine the size of the contact faces acting to prevent the nut from being torn off under abnormal stresses in the direction of the centre line, but nevertheless the nut will be tightly held by reason of the small value of the angle $\beta^1$.

Since the operative face when the nut is screwed down is herein divided into two parts which have a certain spacing, it will be no longer necessary to incline both parts, but only one of them; this is shown in the dotted lines in Fig. 3. The outer face of the bolt thread is parallel to the centre line. It is not essential that the faces $f$, $g$, $m$, $n$, $h$, $i$, etc. of the bolt and nut should be exactly perpendicular to the centre line, and such faces may be tapered, as shown in the dotted lines Fig. 4, or rounded, as shown in the dotted lines in Fig. 5, or they may be beveled according to needs. The same is true for the faces $g\ h\ l\ m\ no$, $i\ j$, which may be tapered in part, employing for this portion any suitable outline. Obviously, the outline with spaced parts as shown in Figs. 3, 4 and 5 can be employed irrespective of the value of the angle $\beta^1$, i. e, whether the nut is jammed upon the bolt or otherwise, supposing however that the condition of tight holding is maintained.

It will be observed that the reaction faces of the two threads, i. e. the faces which coact to resist direct movement between the parts in the direction of unscrewing are formed with coacting helicoidal abutment surfaces making a considerable angle with the axial line of the thread; that the coacting helicoidal faces of the two threads opposed to the reaction faces also make a considerable angle with the axial line of the threads; and that said coacting abutment surfaces and said coacting opposed thread faces positively limit the extent of direct axial play between the threads and permit sufficient relative crosswise displacement between the threads longitudinally of the axial line of the threads to allow helicoidal coacting jam surface portions of the reaction faces of the threads to shift into either jamming or free-turning relation with each other.

It will be apparent from Fig. 5 that the coacting thread face portions $m\ n$, $h\ i$, positively limit the extent of the jamming action of the thread face portions $g\ h$, $l\ m$, and $i\ j$, $n\ o$ on each other, and also offer great resistance to axial strain in the direction of disconnection of the two screw-threaded parts, and, as most clearly shown in Figs. 3 and 5, the threads are so formed as to permit sufficient direct axial play therebetween to permit free-turning or effect a tight-holding jamming engagement between the threads.

Obviously, the thread which forms the subject-matter of my said invention, is applicable not only to bolts but to screw-threaded rods, metal screws, and like machine parts.

I claim:

1. In combination, a bolt and a nut in threaded engagement, the threads on the nut and bolt being of equal pitch and the pitch of the threads being uniform from end to end, the cross-sectional contour of the two threads being such as to permit axial play between the engaged threads and to provide one pair of coacting thread faces for positively limiting axial thread play in the direction of connection of the nut and bolt and a second pair of coacting thread faces having self-binding friction surface portions and surface portions for positively limiting axial thread play in the direction of disconnection of the nut and bolt.

2. A self-locking and tight-clamping fastening means comprising, in combination, a bolt and a nut provided with cooperating screw threads having side play therebetween, said two threads having the two sides thereof which coact to advance the nut on the bolt into work-clamping position formed with two co-acting helicoidal initially-acting nut-advancing areas and two co-acting helicoidal finally-acting nut-advancing areas, the initially-acting areas lying within the angle of friction transversely of the thread sides and being movable transversely of each other into self-holding frictional engagement by reaction of the work during advance of the nut to fastening position, and the finally-acting areas lying without the angle of friction transversely of the thread sides for finally advancing the nut into tight-clamping fastening position without increasing the transverse movement between the initially-acting areas and without increasing the reaction stresses imposed on the self-held initially-acting areas.

3. A tight-holding fastening means comprising a nut and a bolt threaded for screwing together, the pitch of the nut thread and the pitch of the bolt thread each being constant and the contours of the threads being such as to provide coacting nut and bolt thread portions forcible one across the other while in engagement by reaction stress incident to screwing the nut onto the bolt into work-holding position, and to provide coacting nut and bolt thread abutment surfaces for limiting positively the extent of such relative crosswise movement between said coacting thread portions, one of said thread portions having the surface thereof which is engaged by the other thread portion during such crosswise thread movement of zero curvature and making an angle with the axial line of the bolt less than the angle of friction.

4. A self-locking and tight-clamping fastening means comprising, in combination, a bolt and a nut provided with cooperating screw threads having side play therebetween, said two threads having the two sides thereof which coact to advance the nut on the bolt into work-clamping position formed with two co-acting helicoidal initially-acting nut-advancing surfaces of zero transverse curvature and two co-acting helicoidal finally-acting nut-advancing surfaces of zero transverse curvature, the initially-acting surfaces making an angle with the axial line of the bolt less than the angle of friction and being movable transversely of each other into self-holding frictional engagement by reaction of the work during advance of the nut to fastening position, and the finally-acting surfaces making an angle with the axial line of the bolt greater than the angle of friction and being movable by the reaction of the work into abutting engagement upon tight binding of the initially-acting surfaces for finally advancing the nut into tight-clamping fastening position without increasing the transverse movement between the initially-acting surfaces and without increasing the reaction stresses imposed on the self-held initially-acting surfaces.

5. A separable threaded coupling for two parts, characterized by the fact that the two parts are provided with complementary threads each having its reaction face formed to provide two longitudinally extending reaction-taking surface portions of zero transverse curvature disposed at angles to the axial line of the coupling less than the angle of friction and separated by an intermediate longitudinally extending reaction-taking portion of zero transverse curvature disposed at an angle to the axial line of the coupling greater than the angle of friction.

6. A tight-holding screw coupling for two parts, characterized by the fact that the parts are provided respectively with internal and external threads of equal pitch, said two threads having their coacting reaction faces provided with coacting, longitudinally extending, friction-jamming surface portions of zero transverse curvature making an angle transversely thereof with the axial line of the coupling less than the angle of friction, said coacting friction-jamming reaction face portions of the two threads being of different widths, said two threads having their coacting reaction faces provided with coacting, reaction-motion-limiting surface portions of zero transverse curvature making an angle transversely thereof with the axial line of the coupling greater than the angle of friction, the pitch of the threads being so correlated with the relative widths of said coacting jamming face portions of the two threads as to permit shifting of the coacting jamming face portions into and out of jammed relation by relative displacement of the jamming portions axially of the threads.

7. A tight-holding screw coupling as claimed in claim 6, wherein the reaction faces of the two threads are each provided with two jamming surface portions of different widths located different distances from the axial line of the coupling at opposite sides of the reaction-motion-limiting surface portion thereof, the narrow jamming surface portion of each thread coacting with the wide jamming surface portion of the complementary thread, the faces of the two threads opposed to the reaction faces thereof being of zero curvature and making an angle transversely thereof with the axial line of the coupling greater than the angle of friction.

8. A tight-holding screw coupling for two members subject to strains in the direction of uncoupling, comprising external and internal screw threads on said members having, on the coacting faces thereof which resist straight-line movement in the uncoupling direction, coacting jam portions adapted to jam frictionally on each other upon relative straight-line displacement between the jam portions in uncoupling direction and coacting non-jamming stop portions spaced apart when said jam portions are in non-jamming relation and adapted to engage mutually and to limit positively the extent of displacement between said jam portions in the jamming direction.

9. In combination, a male screw element, and a female screw element engaged with the male screw element, the engaged male and female screw threads on said elements being of equal pitch and the cross-sectional contours of said threads being such as to provide coacting self-holding friction surfaces of zero curvature transversely of the threads making an angle with the axial line of the threads within the angle of friction, and to provide abutment surfaces arranged to permit crosswise movement between the self-holding surfaces into and out of self-holding engagement and to limit positively the extent of such sidewise movement between the self-holding surfaces in both directions.

10. In combination, a pair of relatively rotatable members having engaged threads, two opposed helicoidal side faces of the engaged threads each having two helicoidal surface portions of different widths and both of low slope relatively to the axial line of the threads, the narrower surface portion of each thread side face being movable across the wider surface portion of the other thread side face from free-turning relation into self-holding engagement, and said side faces of the two threads also having co-acting relatively abrupt surface portions engageable to prevent positively the generation of destructive stresses by crosswise movement of the first-mentioned surface portions into self-holding engagement, the two surface portions of each thread face having the low slope being arranged at opposite sides of the abrupt surface portion of the thread face different distances from the axial line of the thread.

11. In combination, a pair of members having interfitting male and female screw threads of equal pitch each having one face formed with two helicoidal face portions, each of zero transverse curvature and making a small angle with the axial line of the threads, and an intermediate helicoidal face portion of zero transverse curvature making a large angle with the axial line of the threads, the face portions of the said male and female thread faces which make the large angle being opposed to each other, the face portions of the said male and female thread faces which make the small angles being opposed to each other, and the opposed face portions of the said male and female thread faces making the small angles being of different widths.

12. The combination of a member having an external screw thread, and a second member having an internal screw thread engaged with the thread on the first member, the two threads being formed with coacting opposed helicoidal surfaces so related as to lock the threads frictionally against accidental relative turning movement upon a limited crosswise movement between said surfaces of the threads in one direction, and also being formed with coacting opposed helicoidal abutment surfaces engageable only upon locking of the threads against accidental relative turning movement and adapted to limit positively crosswise movement between the locking surfaces of the threads in the direction effecting locking of the threads together.

13. In combination, a pair of relatively rotatable members having engaged screw threads, two coacting sides of the engaged threads having opposed helicoidal surface portions of zero transverse curvature making an angle with the axial line of the thread within the angle of friction and movable one across the other, and opposed helicoidal surface portions disposed transversely thereof abruptly to the axial line of the threads, the last-mentioned two opposed surface portions being co-related with the first-mentioned two opposed surface portions for engagement thereof after tight-binding is effected between the first-mentioned two opposed surface portions and before the generation of destructive stresses by crosswise movement of the first-mentioned two surface portions into tight-binding engagement.

14. In combination, a pair of relatively rotatable members having interfitting male and female screw threads of equal pitch relatively displaceable crosswise of each other, one of said threads having a helicoidal friction jam surface portion sloping slightly toward the axial line of the threads and crosswise of which the other thread is displaceable while engaged therewith from free-turning relation into self-locking relation, and said two threads having coacting helicoidal abutment surface portions arranged for engagement only when said threads are displaced into self-locking relation and disposed abruptly relatively to the axial line of the threads to limit positively relative crosswise displacement of the threads in the direction effecting locking engagement between the threads.

15. A nut, for use in a tight-holding bolt and nut fastening, having an internal screw thread of constant pitch, said thread having the side thereof which is subject to reaction stresses upon screwing of the nut on a bolt formed with a helicoidal bolt-thread-engaging abutment surface portion disposed abruptly relatively to the axial line of the nut, and also formed at each side of said abutment surface portion with a helicoidal bolt-thread-engaging surface portion having a slight slope toward the axial line of the nut.

16. A nut, for use in a tight-holding bolt and nut fastening, having an internal screw thread of constant pitch, said thread having the side thereof which is subject to reaction stresses upon screwing of the nut upon a bolt formed to present a helicoidal bolt-thread-engaging surface portion of sufficiently slight slope toward the axial line of the nut to permit jamming thereof tightly upon a bolt thread by the reaction stresses, and also formed with a helicoidal bolt-thread-engaging surface portion sufficiently abrupt relatively to the axial line of the bolt to limit positively the degree of the reaction stresses which can be generated in screwing the nut on a bolt.

17. A bolt, for use in a tight-holding bolt and nut fastening, having a shank provided with an external screw thread of constant pitch having a helicoidal reaction surface portion forming an abrupt shoulder facing away from the nut-receiving end of the shank and also having at each side of said surface portion a helicoidal reaction surface portion sloping slightly toward the axial line of the thread away from the nut-receiving end of the shank.

18. A bolt, for use in a tight-holding bolt and nut fastening, having the shank thereof formed with an external nut-holding screw thread of constant pitch provided with a helicoidal surface portion of sufficiently slight slope toward the axial line of the shank and so arranged as to permit jamming of a nut thread thereupon by reaction stresses due to screwing the nut against the work, and also provided with a helicoidal surface portion sufficiently abrupt relatively to the axial line of the shank and so arranged as to limit positively the degree of the jam action stresses which can be generated in screwing a nut upon the bolt.

19. A tight-holding screw element having a thread formed at one side thereof from end to end with three helicoidal reaction surface portions of equal pitch, the intermediate surface portion being disposed abruptly transversely thereof relatively to the axial line of the thread and the other two surfaces being disposed transversely thereof at a slight angle to the axial line of the thread.

20. A tight-holding screw element having a thread formed at one side thereof with a helicoidal reaction surface of zero transverse curvature making a slight angle with the axial line of the thread for wedging of another thread thereon, and with a helicoidal reaction surface disposed abruptly relatively to the axial line of the thread for limiting the wedging movement of a thread on said first-mentioned surface.

21. A tight-holding screw element having a screw thread one side of which has a helicoidal reaction surface portion sloping transversely thereof toward the axial line of the thread within the angle of friction to form a thread-binding surface, and also has a helicoidal reaction surface portion disposed abruptly transversely thereof to the axial line of the thread and forming a binding action limiting abutment adjacent one edge of the first-mentioned reaction surface portion.

In testimony whereof I have signed this specification.

HUGUES LOUIS DARDELET.